US008328428B2

(12) United States Patent
Andersson et al.

(10) Patent No.: US 8,328,428 B2
(45) Date of Patent: Dec. 11, 2012

(54) HUB-BEARING ASSEMBLY FOR SOIL-WORKING DISCS

(75) Inventors: Ove L. Andersson, Alingsås (SE); Lorenzo Dellamore, Pero (IT); Gianmario Fadda, Borgaro Torinese (IT); Maurizio Giovannelli, Nichelino (IT); Mauro Sassi, Moncalieri (IT); Stefano Urso, Turin (IT); Wolfgang Husslein, Gerolzhofen (DE); Cristian Concu, Turin (IT)

(73) Assignee: Aktiebolaget SKF, Göteborg (SE)

( * ) Notice: Subject to any disclaimer, the term of this patent is extended or adjusted under 35 U.S.C. 154(b) by 698 days.

(21) Appl. No.: 12/312,359

(22) PCT Filed: May 24, 2007

(86) PCT No.: PCT/IB2007/051964
§ 371 (c)(1),
(2), (4) Date: May 5, 2009

(87) PCT Pub. No.: WO2007/105185
PCT Pub. Date: Sep. 20, 2007

(65) Prior Publication Data
US 2010/0025057 A1 Feb. 4, 2010

(30) Foreign Application Priority Data
Nov. 6, 2006 (IT) .............................. TO2006A0789

(51) Int. Cl.
*F16C 13/00* (2006.01)
*F16C 33/76* (2006.01)
(52) U.S. Cl. ........................................ 384/460; 384/481

(58) Field of Classification Search .................. 384/460, 384/480, 477, 586–589, 543–547, 481, 482, 384/484–487; 111/140, 157, 158, 163–169, 111/177–179, 191–195; 277/349, 353, 551, 277/562, 572
See application file for complete search history.

(56) References Cited

U.S. PATENT DOCUMENTS

| | | | | |
|---|---|---|---|---|
| 2,597,942 A | * | 5/1952 | McCullough | 384/460 |
| 3,980,355 A | * | 9/1976 | Gilles | 384/460 |
| 4,249,782 A | | 2/1981 | Frank | |
| 2004/0228556 A1 | * | 11/2004 | Ohtsuki et al. | 384/448 |
| 2006/0012129 A1 | * | 1/2006 | Oldenburg | 277/572 |

FOREIGN PATENT DOCUMENTS

| | | |
|---|---|---|
| DE | 38 11 443 A1 | 10/1989 |
| DE | 200 12 666 U1 | 12/2000 |
| EP | 1326489 B1 | 7/2003 |
| WO | WO 2007/093534 | 8/2007 |

* cited by examiner

*Primary Examiner* — Phillip A Johnson
(74) *Attorney, Agent, or Firm* — Mark A. Ussai; Bryan Peckjian

(57) ABSTRACT

A hub-bearing assembly serves to rotatably mount a soil-working disc (D) on a supporting axle (A) of an agricultural machine. The assembly comprises a hub-bearing unit (10) and a sealing device (20). The a hub-bearing unit has a radially outer, rotatable outer race (11) from one side of which a flange (12) radially extends for mounting a disc (D). The sealing device (20) is mounted on a side of the hub-bearing unit opposite to the side of the flange (12). The radially outer surface of the assembly has a portion (38) intermediate the flange (12) and the side of the sealing device (20), which is radially recessed so as to serve as a preferential seat for winding wires picked up from the fields during use of the agricultural machine.

13 Claims, 7 Drawing Sheets

HUB-BEARING ASSEMBLY FOR SOIL-WORKING DISCS

BACKGROUND OF THE INVENTION

The present invention refers to a hub-bearing assembly fort a soil working disc, particularly a tilling disc.

These discs are usually arranged side to side on respective axles projecting from the frame of the plough or another similar agricultural machine. Each disc is rotatably mounted by means of a hub-bearing unit comprised of one or two stationary, radially inner races, fixed on a central axle projecting from an arm of the agricultural machine frame, a radially outer race which is integral with a radial outer flange for mounting the disc, and a dual set of balls interposed between the inner and outer races. The inner races, and therefore the whole bearing unit, are axially locked against a shoulder of the axle by tightening a ring nut screwed on the free outer end of the axle. See, for example, EP-B-1 326 489.

In order to prevent contaminants (water, mud, soil) from entering the bearing from the side opposite to that where the disc is mounted, i.e. on the side facing the arm of the frame, some bearing units have been equipped with sealing devices having sealing lips slidingly contacting interface shields. The sealing devices used heretofore have not proven to guarantee efficient sealing for long enough time, particularly if the locking nut is slightly unscrewed or loose.

Efficient sealing action is of primary importance for correct operation of the disc over an acceptable period of time. Since the contamination conditions are extreme, contaminants entering the inner parts of the bearing may rapidly lead to the locking of a disc, consequently reducing productivity. In some cases the entering of contaminants is due to the locking nut being partially unscrewed on the free end of the axle. Also, an efficient sealing action able to prevent leakage of lubricant out of the bearing is of primary importance for the protection of the environment, in order to prevent pollution of the soil by the lubricant.

The performance and life of sealing devices are also limited by metal wires that are used for tying up rolled bales and that are left on the field. These wires are inevitably picked up by the discs and tightly wound around the hubs, forming rather thick coils. The same wires, tangled around and beside the sealing device may destabilize it or move part of it so that the lips of the sealing device are no longer correctly positioned on the respective interface surfaces.

SUMMARY OF THE INVENTION

It is a general object of this invention to provide a highly reliable hub-bearing assembly allowing servicing to become less frequent, also under heavy duty conditions. A particular object of this invention is to guarantee sealing action with time against external contaminants. Another object of this invention is to provide an assembly having a reduced axial bulk, allowing to bring the discs nearer to one another and therefore increase, on a same agricultural machine, the number of discs, without adversely affecting the performance of the sealing devices.

These and other objects and advantages, which will be better understood in the following, are achieved according to the invention by a hub-bearing assembly having the features defined in claim 1. According to another aspect, the invention provides an assembly as defined in claim 14. Preferred embodiments of the invention are set forth in the dependent claims.

BRIEF DESCRIPTION OF THE SEVERAL VIEWS OF THE DRAWINGS

A few preferred, but not limiting embodiments of the invention will now be described, reference being made to the appended drawings, in which.

DETAILED DESCRIPTION OF THE INVENTION

Figure 1:
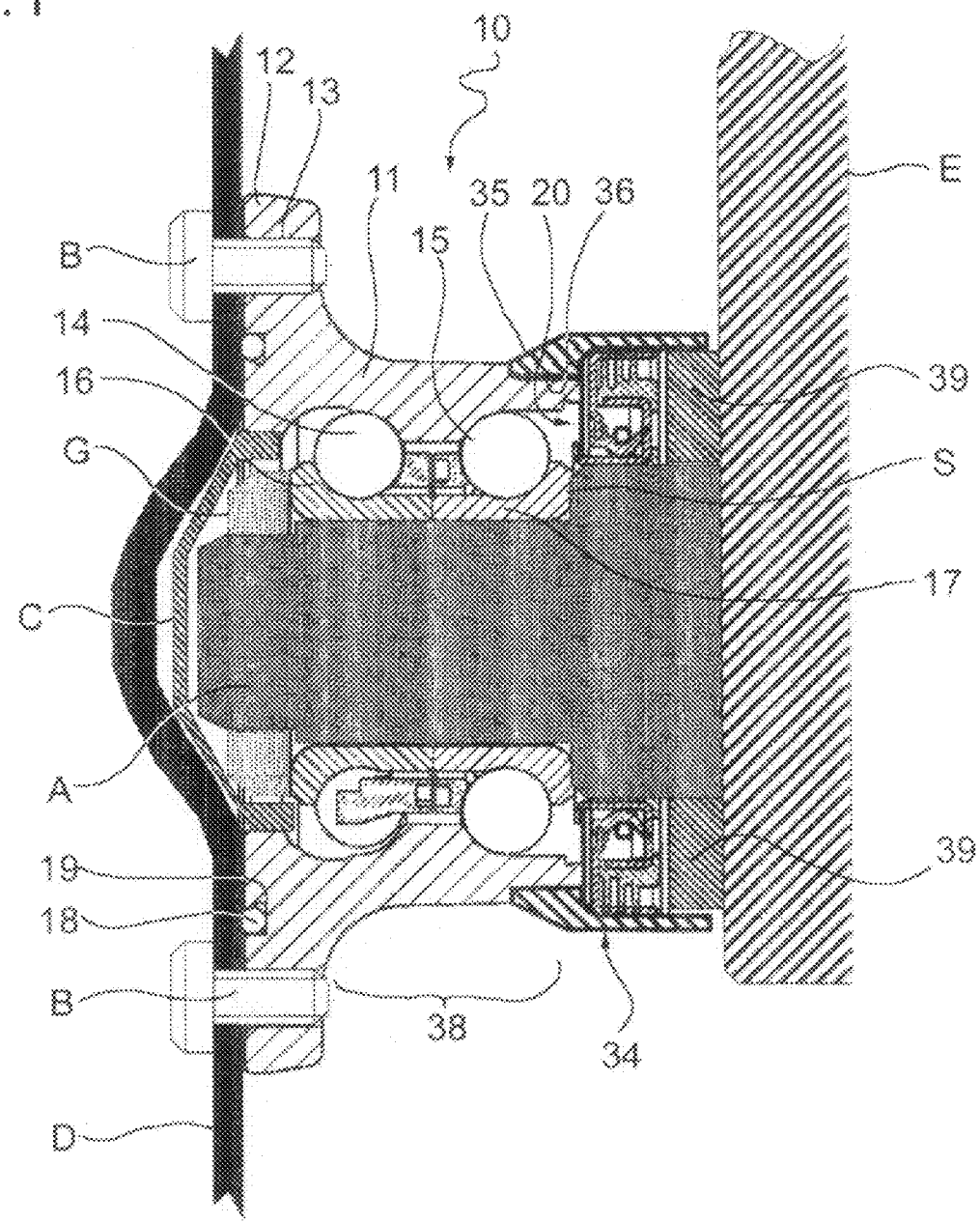
FIG. 1 is an axial cross-sectional view of a first embodiment of a hub-bearing assembly according to the invention, which rotatably supports a soil working disc on an axle projecting from an arm of an agricultural machine.

Referring initially to FIG. 1, a hub-bearing assembly for a soil working disc D comprises a hub-bearing unit, indicated overall at 10, and a cassette-type sealing device associated with the hub-bearing unit 10.

The hub-bearing unit comprises a rotatable outer race 11 forming on one side a radial flange 12 for mounting the disc D by means of bolts B fitted in a number of axial bores 13. A dual set of bearing balls 14, 15 is interposed between the outer race 11 and a pair of inner races 16, 17 tightly mounted side to side on a central axle A projecting from an arm E of the frame of an agricultural machine. The inner races 16, 17 are axially clamped in position against a shoulder S of the axle by means of a ring nut G screwed on the free end of axle A. On the side facing the disc D, an O-ring gasket 18 is accommodated in a circular groove 19 and pressed between the outer race 11 and the disc D for ensuring sealing action against contaminants accessing the inner parts of the bearing. Furthermore, the sealing action is improved by a cap C which closes the outer race 11 on the side of disc D.

The cassette sealing device 20 is fitted on the side of the unit 10 opposite to that where the disc D is located. The sealing device 20 consists of a rotatable part and a stationary part. As shown more clearly in FIG. 2, the rotatable part, secured to the outer race 11, comprises a metal sheet ring 21, called "flinger", having a substantially L-shaped axial cross section, with an outer cylindrical axial wall 22 and a radial wall 23 extending towards the axis of rotation x. Fixed to the zone of the inner peripheral edge 24 of the wall 23 is a gasket 25 of elastic material forming a radial sealing tip 26 and an elongate axial sealing lip 27. It should be noted that in the appended drawings the elastic gaskets are depicted in their non-deformed condition. The stationary part of the sealing device is fixable to the central axle A and includes a metal shield 28 having a substantially C-shaped axial cross section with an inner cylindrical wall 29 engaged by the lip 26, a radial wall 30 against which the end of the elongate lip 27 slides, and a cylindrical wall 31 coaxially outer with respect to the wall 29. On the outer cylindrical wall 31 there is fixed a gasket 32 of elastic material forming a set of parallel radial lips 33 (three in the illustrated example) which slide against the cylindrical wall 22 of the flinger 21.

It will be noted that, owing to the above arrangement, the lips of the two gaskets of the sealing device 20 are substantially co-planar, i.e. they are contained in a very narrow axial space, which gives the sealing device and overall compact size and, consequently, contributes to reduce the axial size of the assembly as a whole. By way of indication, a hub-bearing assembly according to the invention allows to reduce the bulk by about 10% with respect to conventional assemblies, and therefore, allows to increase the number of discs in an agricultural machine and improve its efficiency. Experimental tests carried out by the applicant have shown that the sealing device 20 performs an efficient action also in case the ring nut G is partly unscrewed, in a condition where the assembly has acquired an axial play of 1-2 mm with respect to the supporting axle A. The axially compact arrangement allows to add a side shield 39 in the form of an annular disc that is fixed to the axle A near the sealing device 20. The side shield 39 cooperates with the sealing device 20 performing an additional labyrinth sealing action and protecting the sealing device 20.

In the embodiments shown in FIGS. 1-4, the sealing device 20 is mounted on the outer race 11 of the hub-bearing unit 10 by means of an outer collar 34. Internally, the collar 34 has an enlarged side seat 37 in which the flinger 21 is forcefully fitted. On the outside, the flinger as a conical surface 35 that tapers towards the flange 12 and ends flush with the cylindrical outer surface of the race 11. The collar 34 is forcefully fitted in a recess or seat 36 formed in the outer surface of the race 11 towards the side opposite to that of the flange 12.

Figure 2:
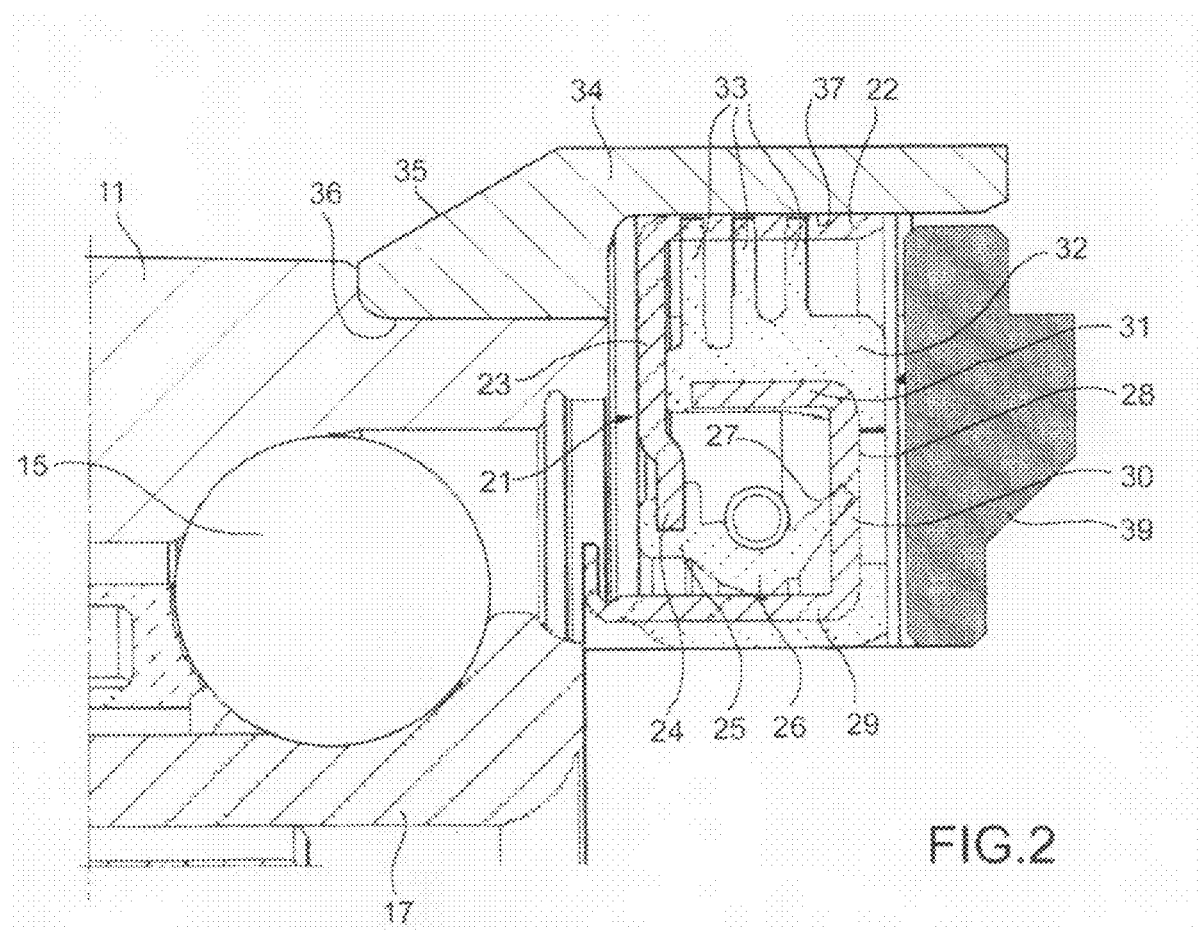
FIG. 2 is an enlarged view of a detail of FIG. 1.
Figure 3:
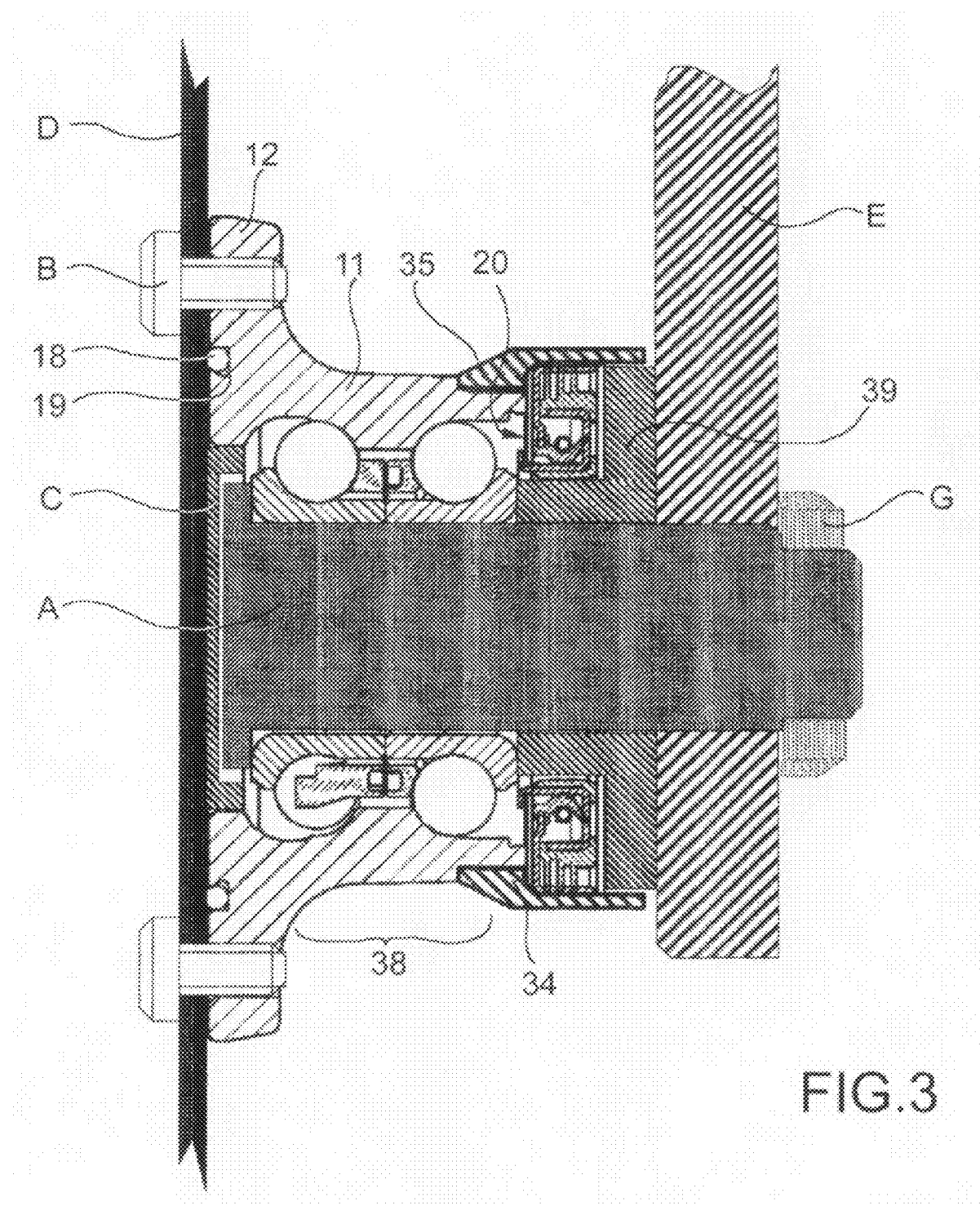
FIGS. 3 and 4 are views similar to FIGS. 1 and 2 showing a slightly different application of the hub-bearing assembly to the according to the invention.
Figure 4:
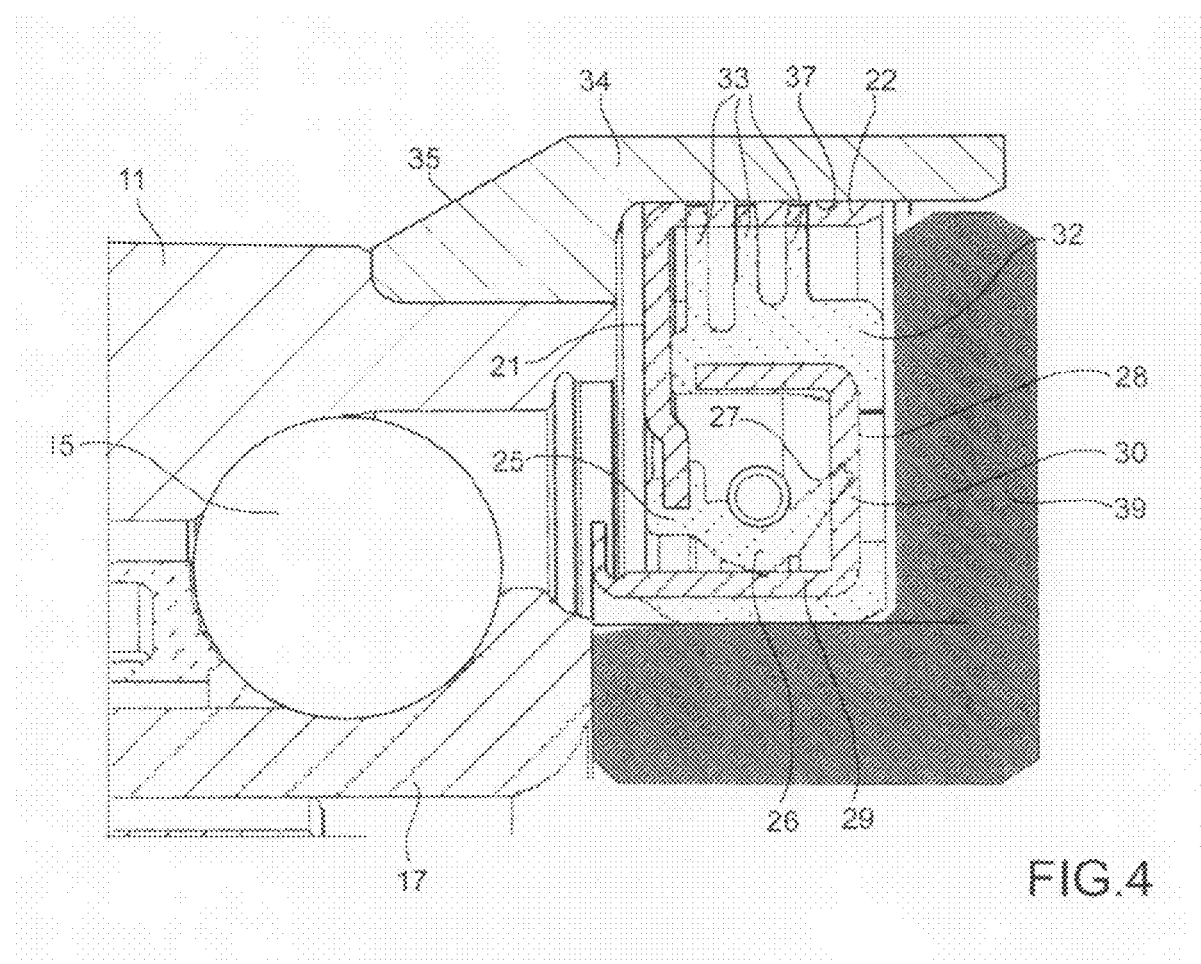

The embodiment shown in FIGS. 3 and 4 differs from that of FIGS. 1 and 2 in the different shape of the axle A, which allows to mount a flat disc D, and in that the side shield 39 has a L-shaped axial cross section. The stationary part of the sealing device 20 is fixable on the cylindrical part of the shield 39.

Figure 5:
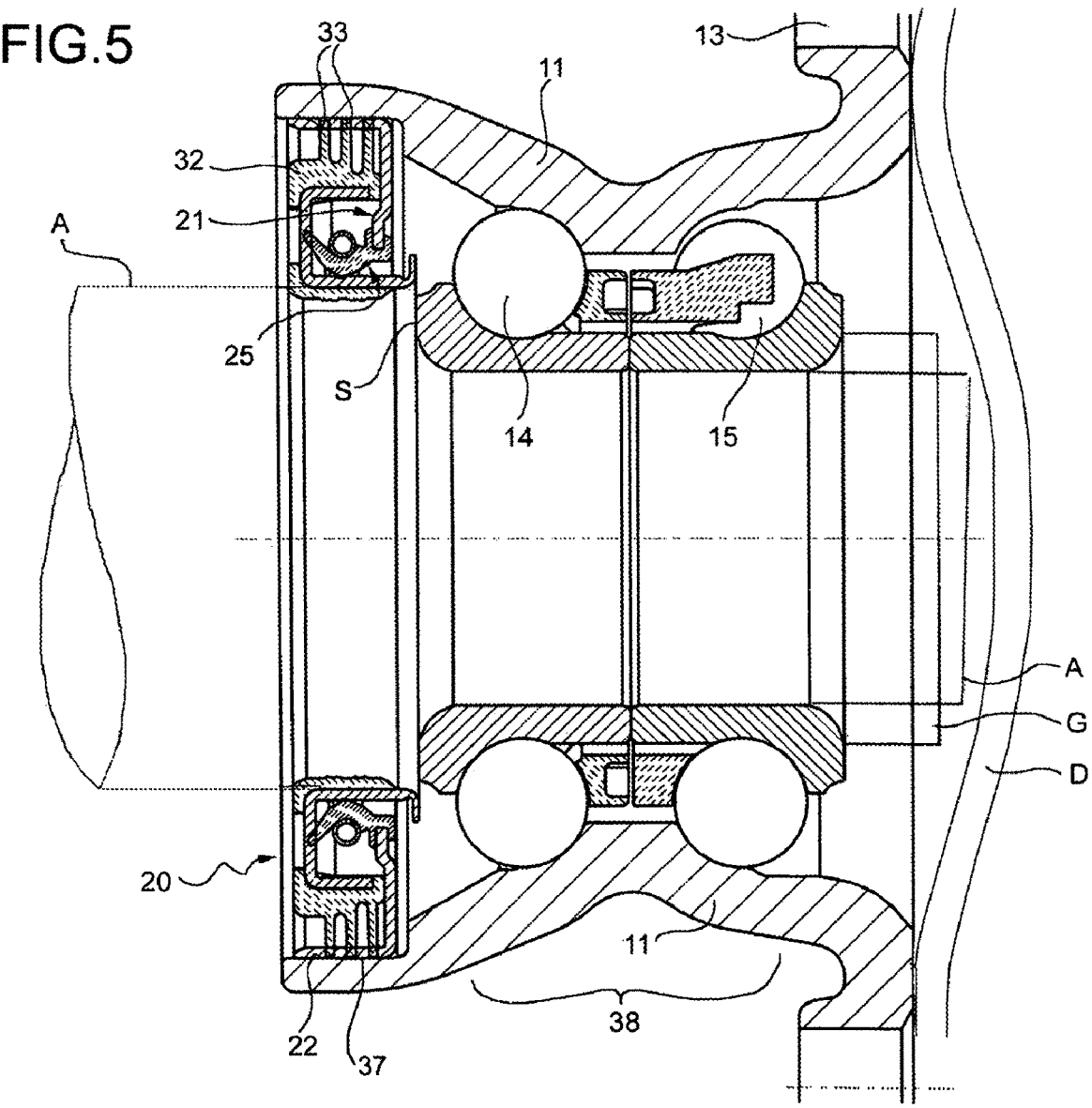
FIG. 5 is an axial cross-sectional view of a second embodiment of a hub-bearing assembly according to the invention.
Figure 6:
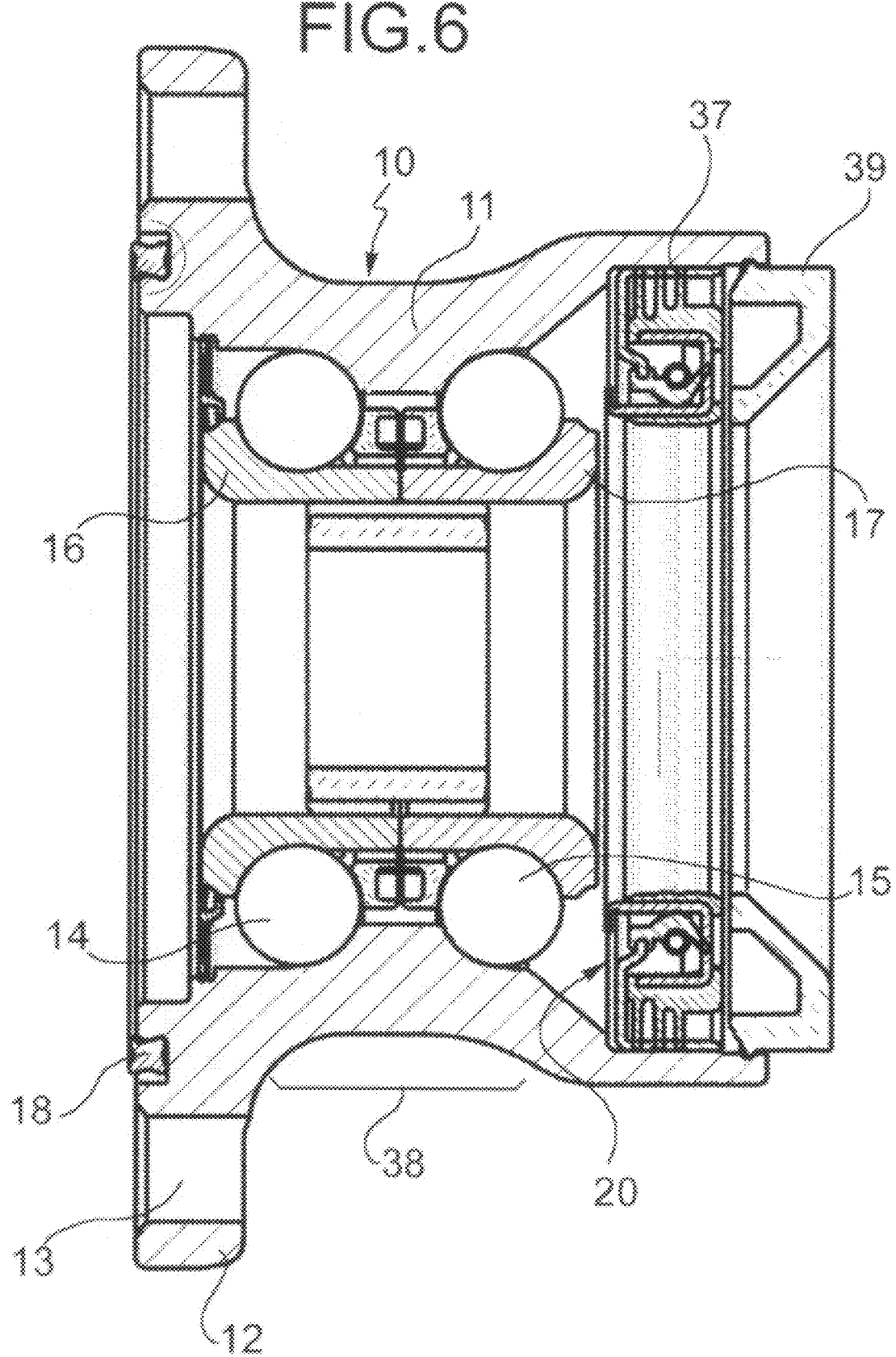
FIGS. 6 and 7 are axial cross-sectional views of a third and a fourth embodiment of the invention.
Figure 7:
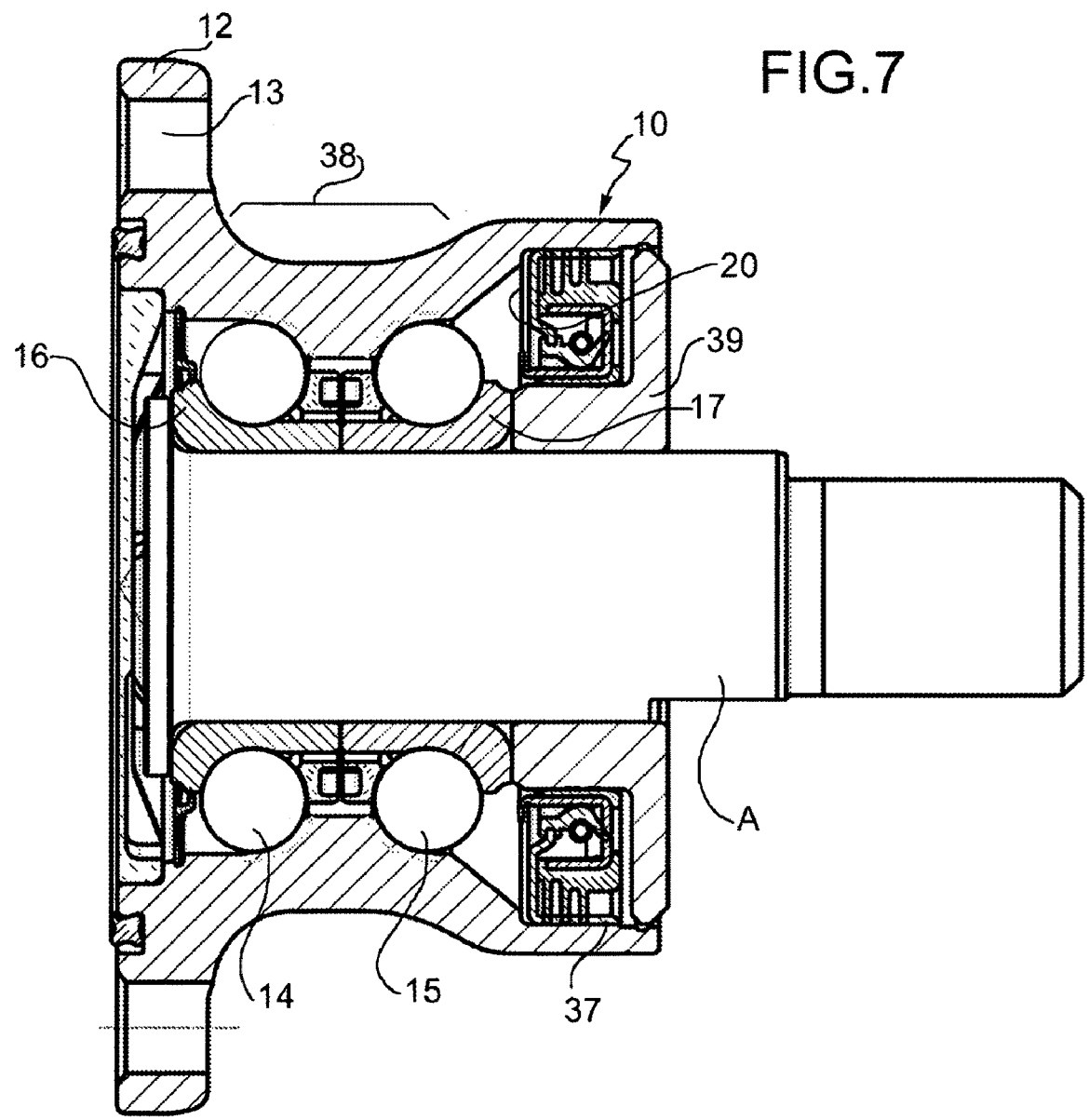

In the embodiments of FIGS. 5, 6 and 7, the sealing device 20 is mounted directly in the outer race 11, in a recess or seat 37 formed in the inner surface of the race 11 towards the side opposite to that of flange 12. In the example of FIG. 5, the outer race 11 is made of metal sheet. The embodiment of FIG. 6 resembles that of FIGS. 1 and 2, except for the outer race 11 extending axially at the side opposite that of flange 12 so as to directly form the seat 37 for the sealing device. A side shield 39 having a differently shaped cross section is shown in FIG. 6. The outer race 11 in the embodiment of FIG. 7 is similar to that of FIG. 6, whereas the side shield 39 shown in FIG. 7 resembles that of FIGS. 3 and 4.

An important feature of the present invention is that the radially outer surface of the hub-bearing assembly has a central zone 38, intermediate the side of the flange 12 and the opposite side where the sealing device 20 is mounted, which is radially recessed. The recessed zone 38 serves as a preferential seat where the wires picked up during use of the agricultural machine are conveyed and wound. These wires are so wound in a zone which is spaced from the side of the sealing device, and therefore do not adversely affect its correct operation. In other words, a channel open in a radially outer direction is formed around the hub, where the said metal wires are conveyed and wound.

It will be observed that in the embodiment of FIGS. 1 and 3, the radially recessed zone 38 of the outer surface of the assembly is partly formed by the outer cylindrical surface of the outer bearing race 11, and partly by the conical surface 35 of collar 34. In the embodiments of FIGS. 5 to 7, the recessed zone 38 is instead entirely formed by the outer race 11.

The invention is not intended to be limited to the embodiments described and illustrated herein, which should be considered as examples of the assembly; rather, the invention may be modified with regard to the shape and arrangement of parts, and to constructional and functional details, as will be apparent to those skilled in the art.

The invention claimed is:

1. A hub-bearing assembly for rotatably mounting a soil-working disc on a supporting axle of an agricultural machine, the hub-bearing assembly comprising:

a hub-bearing unit with a single radially outer, rotatable outer race from one side of which a flange radially extends for mounting the disc, and a sealing device mounted adjacent to and outside of the single radially outer, rotatable outer race and on a side of the hub-bearing unit opposite to the one side of the flange, wherein a radially outer surface of the assembly has a portion located intermediate the flange and the side of the sealing device and radially recessed with respect to the radially outer surface so as to provide a seat for winding wires picked up from the fields during use of the agricultural machine; and wherein the single radially outer, rotatable outer race is provided with raceways for bearing balls; and wherein the radial recess in the seat is designed to funnel, reel and properly coil the wires to be picked up from the fields.

2. The assembly of claim 1, wherein the sealing device includes a rotatable part secured to the outer race and a stationary part, the rotatable part and the stationary part having a separate shield carrying a gasket of elastic material with at least one respective sealing lip each gasket being generally concentric and substantially co-planar with respect to each other.

3. The assembly of claim 2, wherein:

the rotatable part of the sealing device includes the shield having a substantially L-shaped axial cross section, with an outer cylindrical axial wall and a radial wall extending towards the axis of rotation of the assembly, the elastic gasket of the rotatable part forming a radial sealing lip and an elongate axial sealing lip the radial sealing lip and the elongate axial sealing lip being fixed to the radial wall;

the stationary part of the sealing device is fixable to the supporting axle and includes the shield having a substantially C-shaped axial cross section with an inner cylindrical wall and a radial wall, the radial sealing lip being engaged with the inner cylindrical wall and an end of the elongate axial sealing lip being slidable against the radial wall of the stationary part, and an outer cylindrical wall disposed coaxially about the inner cylindrical wall, an elastic gasket of the stationary part being fixed on the outer cylindrical wall and includes a set of parallel radial lips slidable against the outer cylindrical wall of the rotatable part.

4. The assembly of claim 1, wherein the sealing device is mounted on the outer race by means of an outer collar having an outer surface which tapers towards the flange and defines the radially recessed portion of the radially outer surface of the assembly.

5. The assembly of claim 4, wherein the tapered surface ends flush with an outer cylindrical surface of the outer race.

6. The assembly of claim 4, wherein the tapered surface is a conical surface.

7. The assembly of claim 1, wherein said radially recessed portion of the radially outer surface of the assembly is entirely formed by the outer race of the bearing unit.

8. The assembly of claim 1, wherein the outer race is made of metal sheet.

9. The assembly of claim 1, wherein the radially recessed portion has the general shape of a channel open in a radially outer direction.

10. The assembly of claim 1, further comprising a lateral annular shield mountable on the supporting axle proximal to the sealing device and cooperating with the sealing device to perform a further labyrinth sealing action.

11. The assembly of claim 10, wherein the lateral annular shield has an L-shaped axial cross section and a stationary part of the sealing device is fixable on the supporting axle by means of the side shield.

12. The assembly of claim 10, wherein the lateral annular shield has the shape of an annular disc.

13. An assembly comprising:
a soil-working disc for an agricultural machine, the disc being mounted to a radial flange extending from one side of a rotatable outer race of a hub-bearing unit, and
a sealing device mounted adjacent to and outside of the single radially outer, rotatable outer race and on a side of the hub-bearing unit opposite to the side of the flange, wherein a single radially outer surface of the assembly has a portion located intermediate the flange and the side of the sealing device and radially recessed with respect to the radially outer surface so as to provide a seat for winding wires picked up from fields during use of the agricultural machine; and wherein the rotatable outer race is provided with raceways for bearing balls; and wherein the radially recessed portion in the seat is designed to funnel, reel and properly coil the wires to be picked up from the fields.

* * * * *